INVENTOR.
RAYMOND E. BROCHETTI
BY
Brown, Critchlow, Flick & Peckham
ATTORNEYS.

Dec. 23, 1969    R. E. BROCHETTI    3,484,902
INJECTION MOLDING MACHINE WITH AUTOMATIC UNLOADING DRIVE
Filed Aug. 9, 1967    4 Sheets-Sheet 2

INVENTOR.
RAYMOND E. BROCHETTI
BY
Brown, Critchlow, Flick & Peckham
ATTORNEYS.

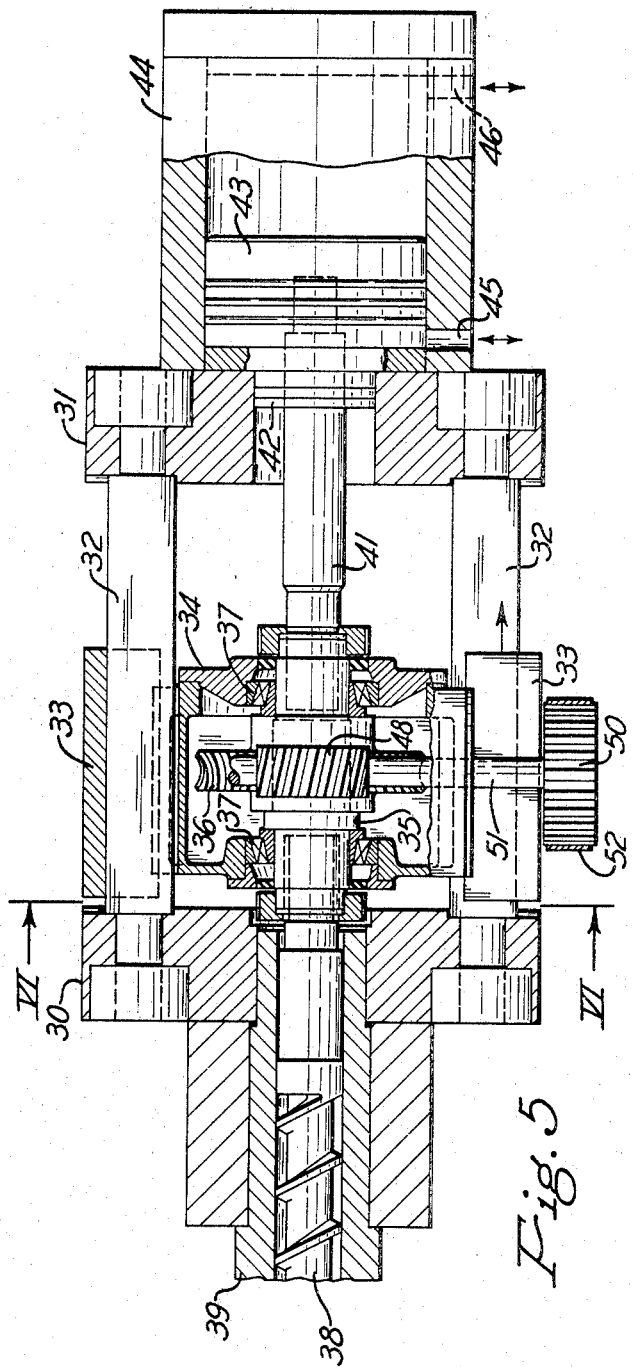
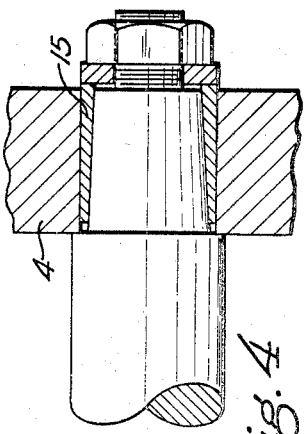

United States Patent Office 3,484,902
Patented Dec. 23, 1969

3,484,902
INJECTION MOLDING MACHINE WITH
AUTOMATIC UNLOADING DRIVE
Raymond E. Brochetti, 1212 Windermere Drive,
Pittsburgh, Pa. 15218
Filed Aug. 9, 1967, Ser. No. 659,399
Int. Cl. B29f 1/06
U.S. Cl. 18—30          10 Claims

ABSTRACT OF THE DISCLOSURE

The gear housing from which the conveyor screw of an injection molding machine is driven is movable back and forth for reciprocating the screw when desired. The gears in the housing are driven from a driving member normally rigidly mounted on a drive shaft by means of friction coupling means between them which is held in coupling position by pressure applied axially to its outer end by pressure means screwed onto the outer end of the drive shaft in the direction of rotation of that shaft. If the conveyor screw is stalled, the drive shaft will start to unscrew from the pressure means, whereby the coupling means will be released and allow the drive shaft to turn in the driving member.

BACKGROUND OF THE INVENTION

Injection molding machines utilizing screw conveyors for extruding plastic material are driven either by electric motors or hydraulic motors. This invention is concerned only with the former. It is an inherent characteristic of an electric motor to increase its torque output if it encounters a sudden heavy load, thereby automatically adjusting the torque output to the load. Momentary overloading, which may be far beyond the rated capacity of the motor, generally does no harm to it. Since such momentary overloading often is encountered by the extruding screws in injection molding machines, this added torque capacity of the electric drive is very desirable. Thus, it is not unusual for such a screw to become bogged-down because of careless operation, overheating, deterioration of the plastic material or for other reasons, but the electric drive, because of its torque-increasing ability, generally is capable of clearing the screw. The high torque capacity of an electric drive also appears to good advantage when molding the more viscous plastics, such as rigid polyvinyl chloride. On the other hand, if the extrusion screw becomes locked in its barrel, such as when the machine is shut down with the screw full of plastic, and then the machine is turned on again after the plastic has cooled and set, or if for some other reason the screw becomes bound in the barrel, the electric drive, because of its torque build-up and the high inertia of the motor rotor, is likely to break or the expensive screw itself may be broken.

It is among the objects of this invention to provide an injection molding machine of improved construction in which the drive will automatically unload in case the screw stalls, in which the drive is protected from excessive overload, in which the drive is automatically disengaged before any damage is done, in which the motor may be shut off automatically in case of overloading, and in which a signal may be given to warn that the operation of the machine has stopped.

The invention is illustrated in the accompanying drawings, in which

FIG. 4 is a fragmentary sectional view of a modification;

FIG. 5 is a fragmentary horizontal section of an injection molding machine; and

Figure 1:
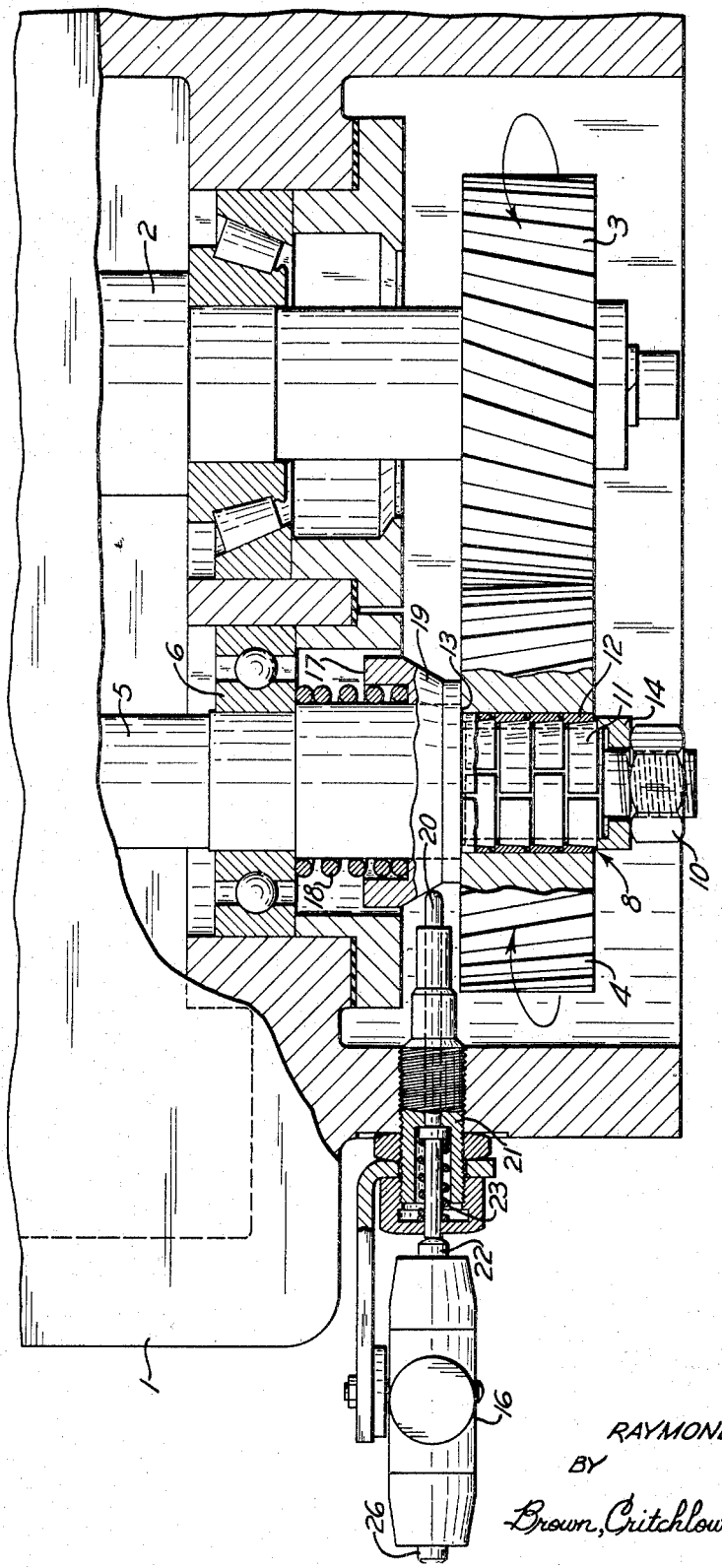
FIG. 1 is a view of one form of the drive, shown mostly in horizontal section.

Referring to FIG. 1 of the drawings, an injection molding machine is provided with a longitudinally reciprocable gear housing 1, in which there is a driven shaft 2 that turns, through suitable gearing, the conveying or extruding screw (not shown) that injects plastic material into molds. Rigidly mounted on the outer end of this shaft there is a circular driven member, in the form of a gear 3, for turning the shaft. This gear meshes with a driving gear 4 mounted on a drive shaft 5 parallel to the driven shaft and rotatably mounted in a bearing 6 in the gear housing. The driving shaft obtains its power from an electric motor 7, indicated in FIG. 3, which is mounted in a suitable location on the gear housing. The inside of the driving gear is considerably larger than the encircled portion of the drive shaft, and in the space between them there is a friction coupling 8 that normally connects the gear and shaft together so that they can rotate as a unit.

In accordance with this invention, the friction coupling is formed to exert pressure both radially inward and outward when pressure is applied axially to its outer end. Such axial pressure is applied by pressure means screwed onto the outer end of the drive shaft 5. The pressure means preferably includes a nut 10 screwed on the threaded reduced outer end of the drive shaft projecting from the outer face of the driving gear. The friction coupling 8 most suitably is formed from several pairs of concentric rings encircling the drive shaft inside gear 4, the inner surfaces of the inner rings 11 and the outer surfaces of the outer rings 12 being cylindrical and engaging the shaft and gear, respectively. The engaging surfaces of the rings in each pair are tapered inwardly away from nut 10. All of the inner rings are placed apart, and the same is true of all of the outer rings, but the inner end of each outer ring engages the outer end of the inner ring in the next pair. The outer ring of the pair of concentric rings farthest from the nut may abut against a shoulder 13 on the drive shaft, which also is engaged by the inner face of the driving gear. The innermost inner ring is spaced from that shoulder. The rings are thin enough and elastic enough for the outer rings to be expanded slightly by internal pressure and the inner rings to be compressed slightly by external pressure.

When the nut is tightened on the shaft, its pressure, which may be applied through a washer 14 if desired, against the outer end of the outermost inner ring moves it inwardly along the shaft and this pushes the encircling ring inwardly also, with the result that the next inner ring is pushed inwardly and in turn moves the encircling ring with it. This continues inwardly along the shaft until the innermost inner ring can move no further, so all of the outer rings are expanded into tight engagement with the surrounding gear by means of the wedging action of the inner rings. This wedging effect reacts on the inner rings to compress them tightly on the shaft. The nut is tightened until the coupling rings engage the drive shaft and driving gear tightly enough to frictionally connect the gear and shaft together during normal operation of the machine.

Instead of a series of coupling rings, it is possible to use only one pair of long concentric rings having inwardly tapered engaging surfaces. In that case the inner end of the outer ring will engage shaft shoulder 13, and pressure will be applied axially to the outer end of the inner ring by means of the nut on the shaft. Or, if desired and as shown in FIG. 4, the tapered surface that is engaged by the outwardly tapered inner surface of an encircling ring 15 can be the surface of the drive shaft itself.

It is a feature of this invention that if the driven shaft 2 is unable to turn, due to stalling of the conveying screw, whereby both gears will be stalled, the drive shaft 5 will automatically be unloaded so that neither the drive nor any of the connected operating parts will be damaged. This automatic unloading is accomplished by having the screw threads on the outer end of the drive shaft extend around the shaft in the same direction that it rotates. By this is meant that if the drive shaft is rotating in a clockwise direction, for example, when viewed from its outer end, then the screw thread extends in such a direction that the nut has to be turned in a clockwise direction in order to screw it onto the shaft. With this arrangement, if the driving gear 4 is stalled, the torque on the drive shaft will increase to the point where the shaft will start to slip in friction coupling 8. However, for a reason to be explained in the next paragraph, the nut 10 will remain stationary with the driving gear and coupling and therefore shaft 5 will start to unscrew itself from the nut. The moment this occurs, the pressure of the nut against the coupling rings is relieved so that inner rings 11 can expand and outer rings 12 can contract to their normal diameters. That reduces or releases the frictional engagement of the coupling with the shaft and gear. The drive shaft then can turn in the stationary gear and coupling more or less freely without damage.

The reason why the drive shaft will slip inside the friction coupling when the driving gear stalls, and why the nut and washer will remain stationary with gear 4 at first so that shaft 5 will turn in the nut, is as follows. The torque transmitted through the drive shaft is a function of the tangential force on the gear teeth of the driving gear where they mesh with the teeth of the other gear. Further, the torque transmitted by the drive shaft is equal to that tangential force multiplied by its radial distance from the center of the shaft. It follows that the torque is greatest near the center of the shaft and becomes less outwardly toward the meshing gear teeth at the same rate that the distance from the center of the shaft increases. Therefore, the tangential force or loading at the surface of the drive shaft within the friction coupling is greater than at the outer surface of the coupling so that shaft will turn in the coupling when the driving gear is stalled. Slippage also occurs between the shaft and coupling because the surface area of the inside of the coupling is less than the outside of it. The nut and washer in tight engagement with the outer end of the coupling tend to remain stationary with it, and so the shaft turns in the nut, which loosens the nut and allows the coupling to release its grip on the shaft and gear. There will be even less tendency for the nut and washer to turn with the shaft if the diameter of the threaded portion of the shaft is reduced as shown, and also if the engaging faces of nut and washer are roughened. Of course, it is only an instant from the moment the shaft starts to slip, because of an overload, and the loosening of the nut, whereby any prolonged high-load slipping that otherwise most probably would cause damage is avoided.

Figure 2:
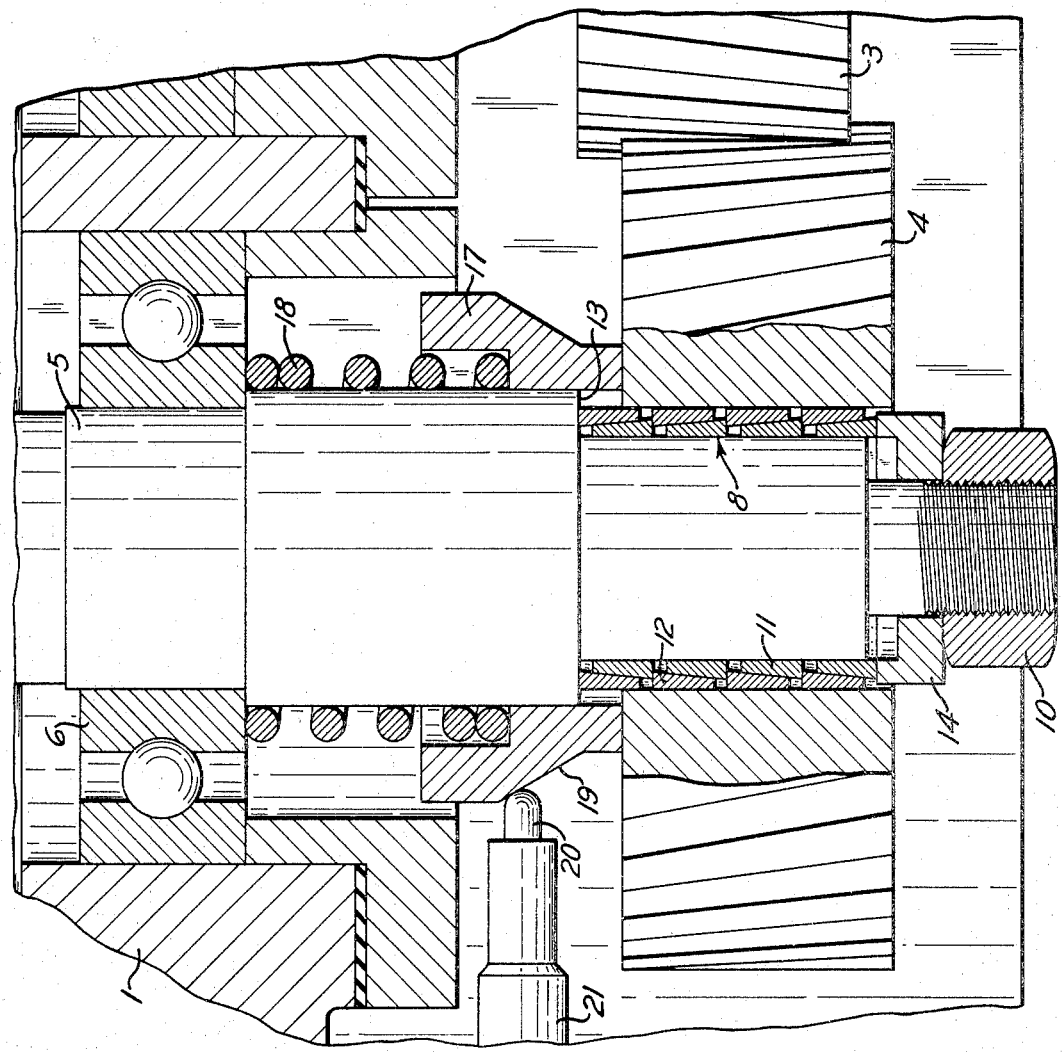
FIG. 2 is a fragmentary enlarged view showing the drive unloaded.
Figure 3:
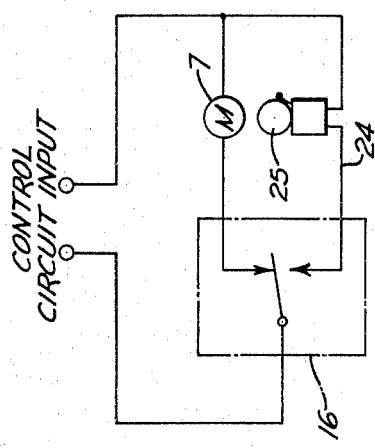
FIG. 3 is a circuit diagram for the driving motor.

Another feature of this invention is that as soon as the grip of coupling 8 on the drive shaft and gear is released, the driving gear and an element behind it can move outwardly on the shaft to actuate an electric switch 16 that will shut off driving motor 7 and, preferably, also warn the operator that the motor has stopped. For this purpose a cam collar 17 is slidably mounted on the drive shaft in engagement with the inner face of gear 4. The collar is pressed against the gear by a coil spring 18 compressed between the collar and shaft bearing 6. The collar has a forwardly tapered conical portion that forms a cam surface 19 normally spaced from the inner end of a rod 20 extending laterally away from the shaft and slidably mounted in a tubular member 21 screwed into the side of gear box 1. The tubular member supports the switch. The outer end of the rod engages the actuator button 22 of the electric switch, which is connected in the motor circuit as indicated in FIG. 3. The rod normally is urged inwardly to a point close to the cam surface of the collar by means of a coil spring 23. When the friction coupling releases its grip on the drive shaft and gear, the coil spring 18 behind the cam collar will push the collar and gear outwardly on the shaft as shown in FIG. 2. This will cause cam surface 19 to push the rod away from the shaft and thereby open the motor switch. By providing driving gear 4 with helical teeth extending in a direction opposite to the direction of rotation of that gear, by which is meant that the upper teeth extend from the outer face of the gear inwardly toward the left when the gear is rotating to the right the pressure of those gear teeth against the sides of the teeth of the driven gear will slide the driving gear outwardly on the shaft so that all that spring 18 has to do is push the collar along the gear.

Since it is desirable to notify or warn the operator that the motor has stopped, if that happens, the switch may be a single pole, double throw, switch so that as it opens the circuit to electric motor 7 it simultaneously closes another circuit 24 in which there is an electrically operated alarm, such as a red light or a bell 25.

After the difficulty that has caused the gears to stop has been remedied, the driving gear can be pushed back on the drive shaft into operating position, and the nut on the end of the shaft tightened again to cause friction coupling 8 to connect the drive shaft and gear together. This inward movement of the gear on the shaft will push the cam collar inwardly also and thereby move it away from the adjoining end of switch rod 20. The spring 23 on the rod then will move the rod away from the switch so that it can be reset in a well-known manner by a reset button 26 in order to turn off the warning signal and start the motor that drives the machine.

It is intended that the drive that has just been described shall be used with an injection molding machine such as shown in FIG. 5. This machine has a pair of heavy vertical front and rear end plates 30 and 31 rigidly mounted in any suitable manner on a base (not shown) where they are held in spaced parallel relation by two laterally spaced bars 32, the ends of which are rigidly mounted in the plates. These bars form rails on which channel-like shoes 33 slide. The shoes are rigidly secured to the opposite sides of a gear housing 34, in which the long hub 35 of a worm gear 36 is rotatably mounted in bearings 37 in the front and back walls of the housing. Rigidly connected to the front end of the hub is the rear end of a conveyor screw 38, which extends through the front plate and forward away from it inside of a long barrel 39 rigidly mounted at its rear end in the front plate. The rear end of hub 35 is rigidly connected to the front end of a piston rod 41, the hub and rod forming a shaft that extends back through a packing gland 42 in an opening in the center of the rear end plate. Mounted on the rear end of the rod behind this plate is a piston 43, which is disposed in a fluid pressure cylinder 44. At the front and rear ends of the cylinder there are the openings 45 and 46, to which fluid under pressure can be delivered alternately in order to reciprocate the piston in the cylinder when desired so that the gear housing and conveyor screw will be moved back and forth. This manner of moving the screw lengthwise is an improvement over the customary system that utilizes a stationary gear housing and a shaft sliding through it for connecting the screw and piston.

Figure 6:
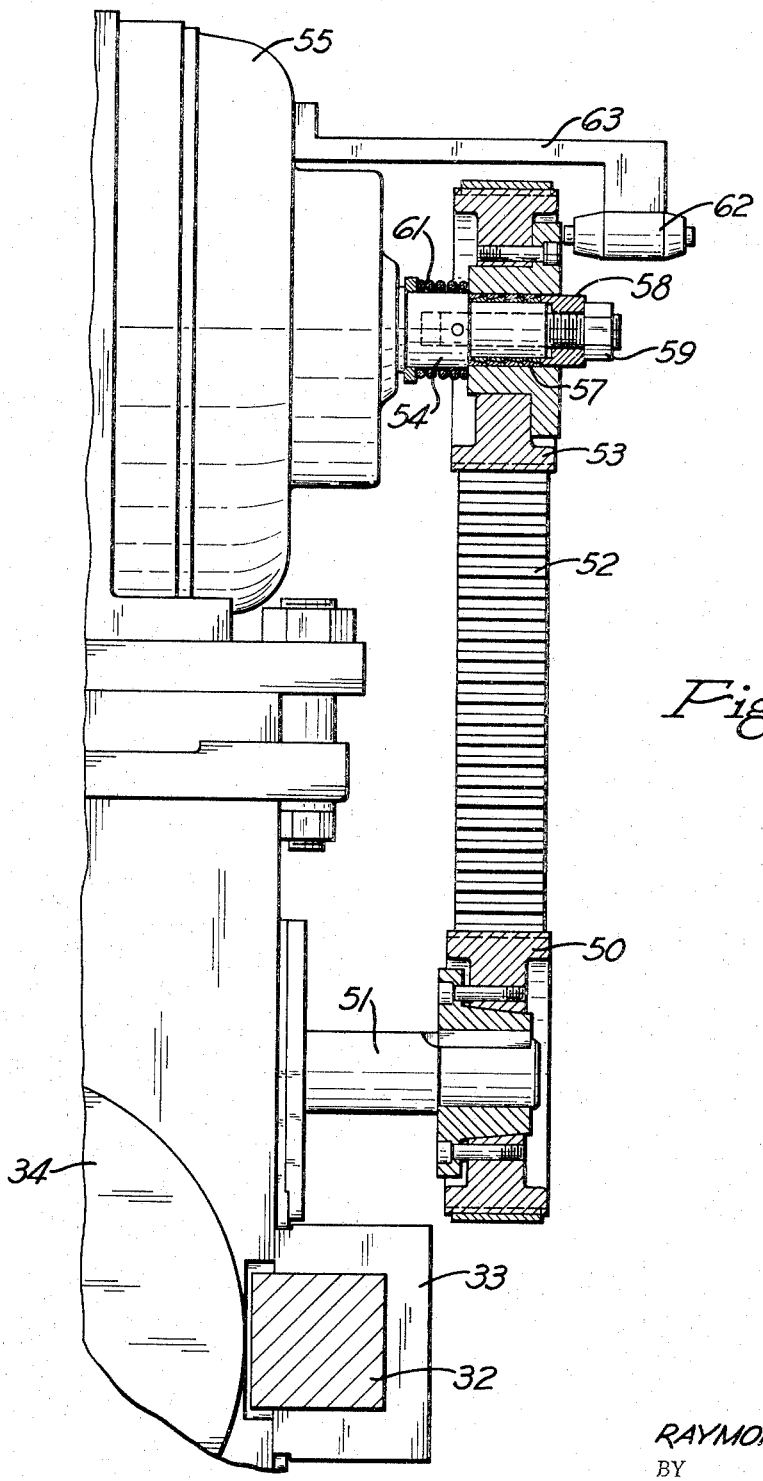
FIG. 6 is an enlarged fragmentary view taken on the line VI—VI of FIG. 5.

In order to rotate the screw, worm gear 36 is turned by a worm 48 on a driven shaft journaled in the opposite sides of the gear housing. This shaft projects from one side of the housing and may be the same as shaft 2 in FIG. 1, in which case driven gear 3 would be rigidly mounted on its outer end and the drive would be the one that has been described. On the other hand, FIGS. 5 and 6 illustrate a modified drive, in which pulleys and a belt are used. Thus, a driven pulley 50 is shown rigidly mounted on the worm shaft 51. This pulley is operatively connected by means of a belt 52 with a driving pulley 53 above it mounted on a drive shaft 54 which can be the shaft of an electrical motor 55 mounted on top of the gear housing. Preferably, the belt is a gear belt and the pulleys are provided with teeth and slots with which the belt meshes.

As shown in FIG. 6, the driving pulley 53 normally is locked to the drive shaft 54 by means of a friction coupling 57 the same as the one shown in FIGS. 1 and 2. The coupling normally is held in operative position by a washer 58 pressed against it by means of a nut 59 screwed onto the outer end of the shaft. In case the conveyor screw is greatly overloaded or stalls driven shaft 51 and the pulley thereon, the threaded end of the drive shaft will start to unscrew itself from the nut, whereupon the friction coupling is relieved so that it no longer engages the shaft and pulley tightly enough to prevent the shaft from turning in the pulley.

With the release of the friction coupling, a compressed coil spring 61 on drive shaft 54 behind pulley 53 moves the pulley outwardly on the shaft a short distance but far enough to actuate an electric switch 62 like the one shown in FIG. 1. This switch can be carried by a bracket 63 attached to the motor. When the switch is actuated by the pulley, the motor is shut off. It will be seen that the machine drive shown in FIGS. 5 and 6 operates in the same manner as the one first described to stop the motor in case the conveyor screw is stalled or overloaded.

According to the provisions of the patent statutes, I have explained the principles of my invention and have illustrated and described what I now consider to represent its best embodiment. However, I desire to have it understood that, within the scope of the appended claims, the invention may be practiced otherwise than as specifically illustrated and described.

I claim:

1. In an injection molding machine having a rotatable and axially movable conveyor screw, a shaft extending rearwardly from the screw and rigidly connected therewith, a piston rigidly mounted on the rear end of said shaft, a stationary cylinder containing the piston, means for delivering fluid under pressure to the ends of the cylinder to move the piston back and forth, a gear rigidly mounted on the shaft between the cylinder and screw, a gear housing surrounding the gear and movable back and forth with it, stationary rails extending lengthwise of the shaft and slidably supporting said housing, a driven shaft journaled in said housing and carrying a gear meshing with said first-mentioned gear, a circular driven member rigidly mounted on said driven shaft for rotating it, a circular driving member operatively connected with said driven member, a drive shaft for said driving member, an electric motor mounted on the housing for driving said drive shaft, the drive shaft having one end extending through the center of the driving member in spaced relation therewith, friction coupling means encircling the drive shaft inside the driving member in engagement with both, said means being formed to exert pressure radially inward and outward when pressure is applied axially to the outer end thereof, and pressure means screwed onto the outer end of the drive shaft in the direction of rotation of that shaft, said pressure means normally exerting sufficient pressure against the outer end of said coupling means axially thereof to force the latter into tight enough engagement with the drive shaft and encircling driving member to frictionally connect that member to the shaft as long as the driving member is not stalled by said conveyor screw.

2. An injection molding machine according to claim 1, including means for moving the stalled driving member axially towards said pressure means when the drive shaft turns in said coupling and pressure means and releases said frictional connection, and an electric switch for stopping said motor actuated when said driving member moves axially.

3. An injection molding machine according to claim 1, including means for moving the stalled driving member axially towards said pressure means when the drive shaft turns in said coupling and pressure means and releases said frictional connection, an electric switch for stopping said motor actuated when said driving member moves axially, and a warning signal controlled by said switch to show that the motor has stopped.

4. An injection molding machine according to claim 1, in which said friction coupling means includes an expandable ring slidably mounted on the drive shaft inside said driving member and having an inner surface tapered toward said outer end of the drive shaft, the drive shaft being provided with a tapered surface fitting against said tapered ring surface, and said pressure means normally engages the outer end of said ring.

5. An injection molding machine according to claim 1, in which said friction coupling means include a pair of engaging concentric expandable rings having engaging surfaces tapered away from said outer end of the drive shaft, and said pressure means normally engages the outer end of the inner ring.

6. An injection molding machine according to claim 5, in which there is a plurality of said pairs of rings disposed in axial alignment, the inner rings being spaced apart and the outer rings being spaced apart but the inner end of each outer ring engaging the outer end of the inner ring in the next pair.

7. An injection molding machine according to claim 1, in which said circular members are pulleys operatively connected by a belt.

8. An injection molding machine according to claim 1, in which said circular members are pulleys operatively connected by a belt, and said machine includes an electric switch for stopping said motor, and means for moving the driving pulley axially when stalled, into a position where it will actuate the switch.

9. An injection molding machine according to claim 1, in which said circular members are meshing gears, and said machine includes a collar slidably mounted on the drive shaft and engaging the inner side of the driving gear, a spring operating if the driving gear is stalled for pushing said collar outwardly along the drive shaft with the stalled gear when the drive shaft turns in said coupling and pressure means and releases said frictional connection, and a normally closed electric switch for said motor having a movable actuator adjacent said collar, the collar having a cam surface for moving said actuator to open the switch when the collar is moved by said spring.

10. An injection molding machine according to claim 9, in which said gears have helical teeth, the teeth of the driving gear extending in the direction opposite to the direction of rotation of said drive shaft, whereby if the driving gear is stalled and the drive shaft turns in said coupling and pressure means and releases said frictional connection the pressure of the stalled driving gear teeth against the sides of the teeth of the outer gear will move the driving gear axially toward said pressure means.

References Cited

UNITED STATES PATENTS

| | | | |
|---|---|---|---|
| 1,938,720 | 12/1933 | Preble | 192—150 |
| 2,224,440 | 12/1940 | Lewis | 192—150 |
| 3,370,324 | 2/1968 | Hehl | 18—30 |
| 3,425,096 | 2/1969 | Morse | 18—30 |

FOREIGN PATENTS 272,051  12/1965  Australia.

J. SPENCER OVERHOLSER, Primary Examiner

MICHAEL O. SUTTON, Assistant Examiner

U.S. Cl. X.R.

64—30; 192—150